(12) United States Patent
Dahms et al.

(10) Patent No.: US 7,534,281 B2
(45) Date of Patent: May 19, 2009

(54) ORGANIC RECYCLING WITH A PIPE-CROSS OR TUBULAR REACTOR

(75) Inventors: Gary L. Dahms, Soda Springs, ID (US); Gary D. Greer, Pocatello, ID (US)

(73) Assignee: Environmental Technologies Capital Partners, LLC, Naples, FL (US)

( * ) Notice: Subject to any disclaimer, the term of this patent is extended or adjusted under 35 U.S.C. 154(b) by 57 days.

(21) Appl. No.: 11/522,083

(22) Filed: Sep. 15, 2006

(65) Prior Publication Data
US 2007/0006624 A1   Jan. 11, 2007

Related U.S. Application Data

(62) Division of application No. 10/322,802, filed on Dec. 19, 2002, now Pat. No. 7,128,880.

(51) Int. Cl.
C05C 9/00 (2006.01)

(52) U.S. Cl. .................... 71/64.03; 71/64.01; 71/64.02; 71/11; 71/32; 71/33; 71/40

(58) Field of Classification Search ..... 71/64.01–64.03, 71/11, 32, 33, 40
See application file for complete search history.

(56) References Cited

U.S. PATENT DOCUMENTS

| | | | |
|---|---|---|---|
| 4,209,313 A * | 6/1980 | Lynn et al. ................ | 65/19 |
| 5,667,556 A * | 9/1997 | Orth et al. ................ | 75/450 |
| 5,984,992 A * | 11/1999 | Greer et al. .............. | 71/11 |
| 6,406,510 B1 * | 6/2002 | Burnham .................. | 71/11 |
| 6,758,879 B2 * | 7/2004 | Greer et al. .............. | 71/11 |
| 2001/0013238 A1 * | 8/2001 | Greer et al. ............ | 71/64.02 |

* cited by examiner

*Primary Examiner*—Kiley Stoner
*Assistant Examiner*—Erin B Saad
(74) *Attorney, Agent, or Firm*—Drinker Biddle & Reath LLP

(57) ABSTRACT

The invention is directed to a process for enhancing the plant nutrient value of relatively low analysis organic waste material (e.g. sewage sludge) involves treating the waste material with an acid and base in a pipe-cross reactor or tubular to form a melt; spraying the melt onto a recycling bed of fines in a granulator and flashing off the water contained in the melt as steam; rolling the melt onto recycled fine particles in a granulator to form granulated particles; and drying these granulated particles in a to form an enhanced plant nutrient value composition (e.g. a fertilizer or soil conditioner having a greater NPK value than the original relatively low analysis organic waste material). The process further includes drawing off the fumes from the granulator, passing them through a dryer with the granulated particles, and subsequently oxidizing the fumes to eliminate volatile organic compounds and/or gaseous hydrocarbon pollutants be converting such into carbon dioxide and water vapor.

10 Claims, 2 Drawing Sheets

ORGANIC RECYCLING WITH A PIPE-CROSS OR TUBULAR REACTOR

RELATED APPLICATIONS

The present application is a divisional of application Ser. No. 10/322,802 filed Dec. 19, 2002 now U.S. Pat. No. 7,128,880.

BACKGROUND

1. Field of the Invention

This invention is directed to systems, devices and methods for converting organic material into fertilizer. More specifically, the invention relates to pipe-cross or tubular reactors that produce an enhanced plant nutrient value composition.

2. Description of the Background

The disposal of sewage sludge is a significant world-wide problem. Current methods of disposing of sewage sludge include incineration, direct land or ocean application, heating and drying the sludge for sterilization and then applying it to land, depositing it in a landfill, or granulating the sludge with a standard rotary granulator with heating and drying being provided by exogenous heat sources (e.g. by burning purchased fuel). While some of these methods result in a fertilizer, such fertilizers are of relatively low analysis with regard to their plant nutrient value.

Methods of expressing a fertilizer's plant nutrient value involve identifying the fertilizer's NPK value, wherein N relates to the amount of nitrogen, P relates to the amount of phosphorus (expressed as $P_2O_5$), and K relates to the amount of potassium (expressed as $K_2O$). Thus, as reported in U.S. Pat. No. 3,050,383, sewage sludge with a 2.5/2.5/0 value contains two and a half percent nitrogen, two and a half percent phosphorous as $P_2O_5$, and zero percent potassium as $K_2O$. Except as otherwise indicated by usage, all percentage values herein are weight-based percentages (i.e. w/w).

Fortunately, methods exist for enhancing the nutrient value of relatively low analysis organic waste material. For instance, in the aforementioned Wilson patent (the contents of which are entirely incorporated herein by reference), a method is disclosed for treating dried animal manure and sewage sludge with controlled amounts of an acid, such as sulfuric acid, phosphoric acid (or an equivalent phosphorous compound, the strength of which is expressed as phosphoric acid), or mixtures thereof, and an aqueous ammoniacal solution, such as aqueous ammonia or ammoniacal nitrogen salt-containing solutions and tumbling the resulting reaction mass to form fertilizer granules having an upgraded or enhanced plant nutrient value.

Other methods of enhancing the plant nutrient value of relatively low analysis organic waste material with acids, bases, or mixtures thereof have also been described (e.g. U.S. Pat. No. 4,743,287, U.S. Defensive Publication T955,002, Norton et al. (Feb. 1, 1977), U.S. Pat. No. 5,466,273, U.S. Pat. No. 5,125,951, U.S. Pat. No. 5,118,337, U.S. Pat. No. 5,393,317, and U.S. Pat. No. 5,422,015.

Tubular reactors are known in the art for producing ammonia salts (e.g. U.S. Pat. No. 6,117,406, U.S. Pat. No. 2,902,342, U.S. Pat. No. 2,755,176, and U.S. Pat. No. 2,568,901, the contents of which are hereby incorporated by reference). Exothermic reactions are carried out in the tubular reactors by reacting a base with an acid in the reactor tube. European Patent Publication 770,586A1 also discloses that tubular reactors may be used for the treatment of relatively low analysis organic waste material. This European Patent Publication generally describes a process of treating such organic waste by introducing the organic waste, ammonia, and an acid into a tubular reactor, carrying out an exothermic reaction, separating vapor from sludge, and then further processing the sludge.

A component typically associated with tubular reactors is a preneutralizer. The preneutralizer is typically used in conjunction with tubular reactors to effect partial neutralization of the acid prior to its introduction into the reactor. However, the use of a preneutralizer poses various disadvantages including difficulty in obtaining accurate control of flow rates. Additionally, operating and equipment costs associated with the use of a preneutralizer often represent a significant expense.

A reactor similar to the tubular reactor is the pipe-cross reactor. Pipe-cross reactors similarly allow for an exothermic reaction to take place, but typically involve the introduction of one or two different acid solutions for reaction with a base in a method to thoroughly mix the reagents. This is an important feature of pipe-cross reactors as it eliminates the need for a preneutralizer. At the first stage of the cross pipe reactor, the base and/or scrubber water and organic material solution are premixed. At the second step, pipe-cross reactors are formed with up to two acid inlets configured such that the acid solutions are introduced perpendicular to the pipe cross reactor as substantially opposing streams. The perpendicular entry and opposing streams allow for thorough mixing of the acids within the reactor, thus eliminating the need for extraneous equipment such as a preneutralizer.

Pipe-cross reactors are well-known and have been used in the past to produce granular NPKS fertilizers from liquid chemicals (e.g. Energy Efficient Fertilizer Production with the Pipe-Cross Reactor (U.S. Dept. of Energy, 1982) (a pipe-cross reactor fit into the granulator drum of a conventional ammoniation-granulation system); Achom et al., "Optimizing Use of Energy in the Production of Granular Ammonium Phosphate Fertilizer" (1982 Technical Conference of ISMA, Pallini Beach, Greece); British Sulfur Corp. Ltd., "TVA modifies its pipe reactor for increased versatility", Phosphorus & Potassium, No. 90, pp. 25-30 (1977); Achom et al., "Efficient Use of Energy in Production of Granular and Fluid Ammonium Phosphate Fertilizers" (1982 Fertilization Association of India Seminar, New Dehli, India); Salladay et al. "Commercialization of the TVA Pipe-Cross Reactor in Regional NPKS and DAP Granulation Plants in the United States" (1980 Fertilization Association of India Seminar, New Dehli, India); U.S. Pat. No. 4,619,684; U.S. Pat. No. 4,377,406; U.S. Pat. No. 4,134,750; U.S. Defensive Publication T969,002 (Apr. 4, 1978) to Norton et al.; and Salladay et al., "Status of NPKS Ammoniation-Granulation Plants and TVA Pipe-Cross Reactor" (1980 Fertilizer Industry Round Table, Atlanta, Ga., US)). More recently, pipe-cross reactors have been successfully used to enhance the plant nutrient value of relatively low analysis organic waste material (e.g. U.S. Pat. Nos. 5,984,992 and 6,159,263, the entirety of both of which is incorporated by reference herein).

One potential drawback of exothermically treating relatively low analysis organic waste material with reactors, such as a pipe cross reactor or tubular reactor, is the potential for exhausting noxious odors during the process. The use of cross-pipe reactors for treating such waste has helped to reduce the odors typically associated with the treatment thereof. However, a need exists to provide greater assurance that such potential odors are eliminated, or at least reduced beyond current emission levels.

Additionally, a continued desire exists to improve the efficiency of sludge treatment, both in terms of capital expenditure as well as in operating costs.

There is a need in the art for relatively simple and efficient processes for processing relatively low analysis organic waste material to an enhanced plant nutrient value composition without substantial emission of noxious odors. Preferably, such processes would produce products that were sized and shaped to be spread by commercially available commercial spreaders.

SUMMARY OF THE INVENTION

The present invention surprisingly overcomes the problems and disadvantages associated with current strategies and designs, and provides improved systems and methods for treating organic material, namely sludge.

One embodiment of the invention is directed to methods for treating relatively low analysis organic waste material having a solids content of at least approximately five percent or greater to form an enhanced plant nutrient value composition. These methods comprise mixing the relatively low analysis organic waste material with scrubber water to form a slurry which is capable of being pumped. The slurry is pumped into a pipe-cross reactor or tubular reactor for reaction with a base and acid, to form a melt. The melt is sprayed onto a recycling bed of fines in a granulator and liquid is flashed off of the melt in the form of steam. The melt is rolled onto fine particles in the granulator to form granulated particles further reacted with a base to complete the product formation, and subsequently dried in a dryer to reduce the moisture content of the granulated particles. Fumes created during the process, such as the flashed off steam, which may also contain particulates and ammonia, are oxidized to destroy gaseous hydrocarbon pollutants contained therein.

Another embodiment of the invention is directed to devices and systems for treating relatively low analysis organic waste material having a solids content of at least approximately five percent in forming an enhanced plant nutrient value composition. The system comprises a pipe-cross reactor or tubular reactor which is configured to receive a slurry, a base, and an acid therein. The reactor is configured to give thorough mixing and retention time so as to allow substantial completion of a reaction between the components introduced therein and form a melt from such components while flowing through the reactor. Substantial completion means that substantially most of the heat of mixing is generated by the mixing step. Preferably at least 50%, 60%, 75%, 85%, 90% or even 95% of the total mixing heat produced by the exothermic step is generated. A granulator, positioned to receive the melt from an outlet of the reactor, is configured to further react the melt with the base reagent to complete product formation and to mix fine particles with the melt to form granulated particles. A dryer receives the granulated particles from the granulator and reduces the moisture content thereof resulting in substantially dried granulated particles. A granule separator receives the dried granulated particles and separates them into fines, product, and oversized particles. The system may also comprise an oxidizer that receives fumes formed during the reaction, granulation, and drying processes. The oxidizer removes gaseous hydrocarbon pollutants from the fumes prior to their exhaust.

Another embodiment of the invention is directed to methods for treating relatively low analysis organic waste having a solids content of at least approximately five percent to form an enhanced plant nutrient value composition. These methods comprise mixing the relatively low analysis organic waste material with scrubber water to form a slurry which is capable of being pumped. The slurry is pumped into a pipe-cross reactor or reactor for reaction with a base, and acids to form a melt. The melt is sprayed onto a recycling be of fines in a granulator and liquid is flashed off of the melt in to form of steam. The melt is rolled onto fine (smaller) particles in the granulator to form granulated (larger) particles and then further reacted with the base reagent to complete product formation and subsequently dried in a dryer to reduce the moisture content thereof, resulting in an enhanced plant nutrient valued composition in the form of dried granulated particles. The granulated particles are conveyed to a dryer along with the steam flashed off during the reaction and granulating processes. The granulated particles are then dried to reduce the moisture content thereof to form dried granulated particles which comprise an enhanced plant nutrient value composition.

Another embodiment of the invention is directed to systems for treating relatively low analysis organic waste material having a solids content of at least approximately five percent in forming an enhanced plant nutrient value composition. The system comprises a pipe-cross reactor or tubular reactor for receiving a slurry, a base, and an acid therein. The reactor is configured to give thorough mixing and adequate retention time so as to allow substantial completion of a reaction between the components introduced therein and form a melt from such components while flowing through the pipe-cross reactor. A granulator, positioned to receive the melt from an outlet of the reactor, is configured to further react the melt with the base reagent to complete product formation and to mix fine particles with the melt to form granulated particles. A dryer receives the granulated particles from the granulator and reduces the moisture content thereof resulting in substantially dried granulated particles. The dryer also receives the flashed-off steam and fumes formed during the reaction and granulation processes. A granule separator receives the dried granulated particles and separates them into fines, product, and oversized particles.

Other embodiments and advantages of the invention are set forth, in part, in the following description and, in part, may be obvious from this description, or may be learned from the practice of the invention.

DESCRIPTION OF THE INVENTION

As embodied and broadly described herein, the present invention is directed to systems and methods for treating organic material. More specifically, the present invention relates to systems and methods for treating sludge and converting sludge into fertilizer.

Figure 1:
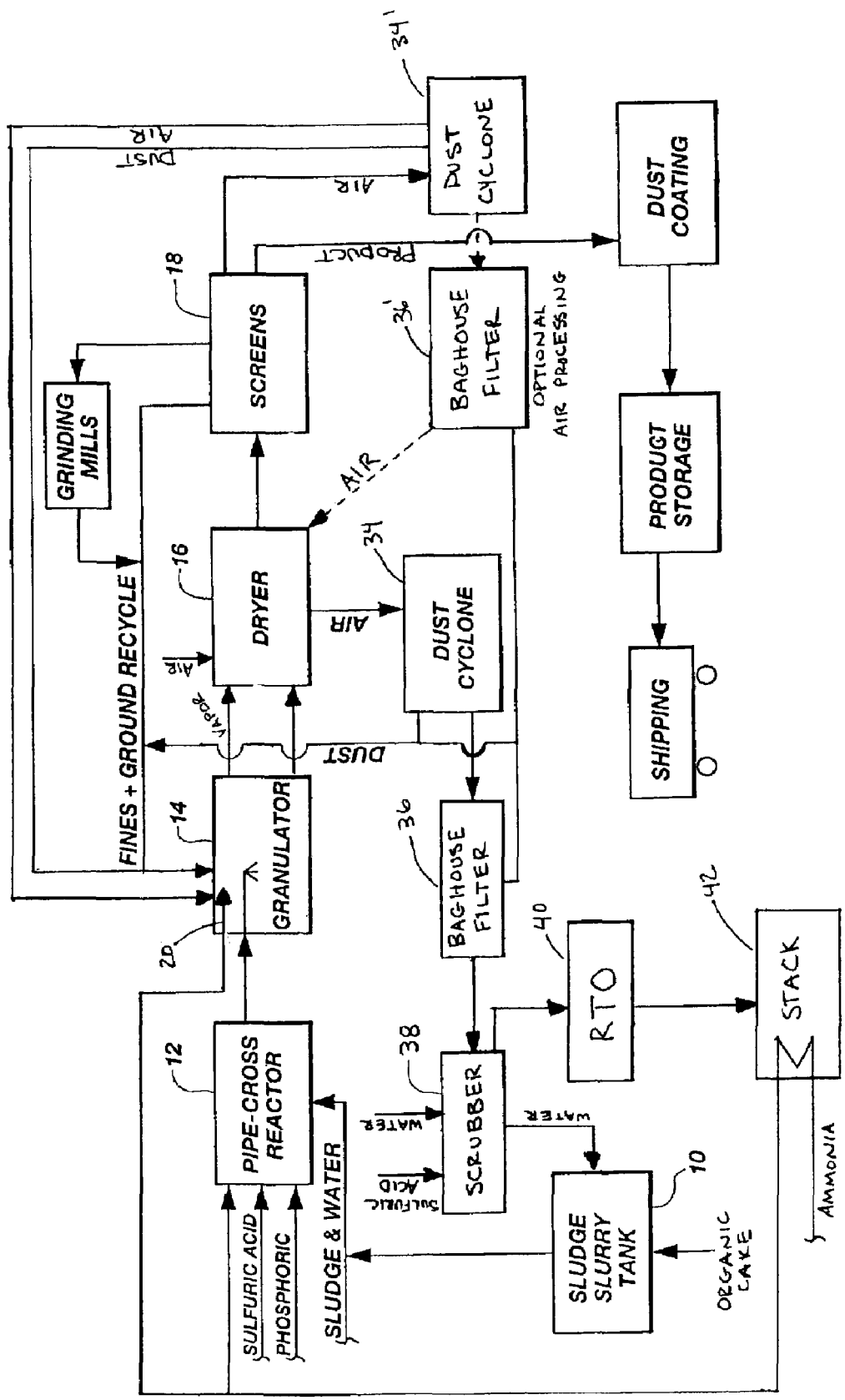
FIG. 1 A process flow diagram of one embodiment of the invention.

As depicted in FIG. 1, a process for enhancing the plant nutrient value of organic waste material generally involves mixing the organic waste material with water in an agitation tank or sludge slurry tank 10 to form a slurry. The water used in making the slurry may desirably include scrubber water from the hereinafter described scrubber 38, which may comprise waste acid. The slurry is mixed at a sufficient concentration and consistency such that it will, preferably, process the organic waste material as quickly as possible, but will not clog or block a reactor during operation. A preferred reactor is a pipe-cross reactor 12, but a tubular reactor might alternatively be used, or even used, in a system, in conjunction with a pipe cross reactor. The particular slurry concentrations and consistencies will depend, to some extent, on the size and amount of insoluble particulate material contained in the particular organic waste material and the size and length of the reactor components. However, as delivered to the pipe-cross reactor, the slurry generally has a solids content of at least about five percent and possibly as high as about 35%. Preferably, the solids content of the slurry is from about 10% to 27%.

As depicted in FIG. 1, the slurry is pumped from the agitation tank 10 to a pipe-cross reactor 12 for an exothermic reaction with, for example, a base such as ammonia and an acid or acids such as sulfuric acid, phosphoric acid, and mixtures thereof, with or without extra water to form a melt.

Amounts of acid and base used in the exothermic process can be determined by one of skill in the art. However, for guidance in the neutralization of ammonia, approximately one mole of sulfuric acid, or two moles of phosphoric compounds expressed as phosphoric acid, is used for each two moles of ammonia. Concerning the concentration of phosphoric acid, typical molar ratios of N:P in the pipe-cross reactor are between 0.4:1 to 0.7:1, preferably 0.55 to 0.65:1, concerning the concentration of sulfuric acid, typical molar ratios of N:S in the pipe cross reactor are between 0.5:1 and 0.8:1 preferably 0:65:1 to 0.72:1. The molar amount of nitrogen should take into consideration not only the amount of ammonia being added but the typical amount of ammoniacal nitrogen contained in the particular organic waste material.

Other acids which may be used with the invention comprise nitric acid, acetic acid, citric acid and mixtures thereof, all of which are well know to those skilled in the art (e.g, nitric acid and an ammonia compound which might form ammonium nitrate in the presence of organic materials which is explosive). Whatever the acid or acids chosen, the strength of one of the acids used in the process will preferably be equivalent to 90% sulfuric acid (e.g. 93 to 100 percent sulfuric acid).

Figure 2:
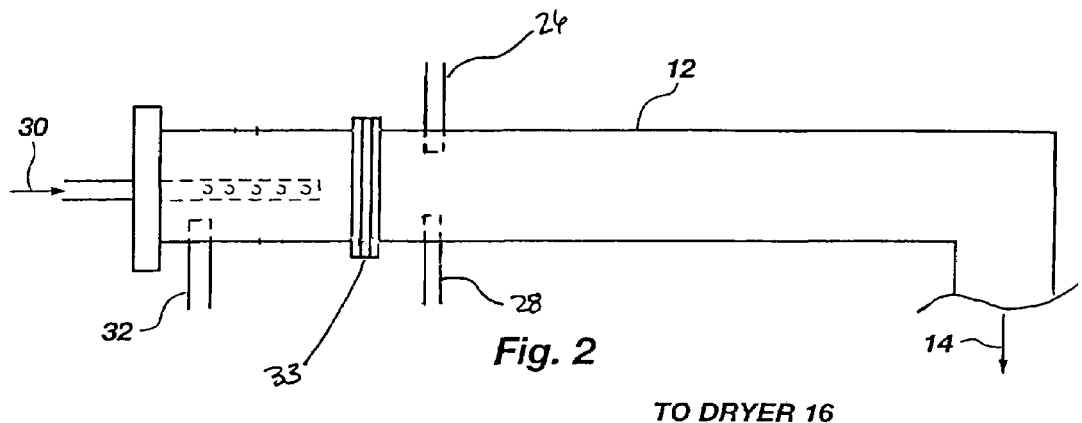
FIG. 2 A stylized view of a pipe-cross reactor.

As depicted in FIG. 2, the pipe-cross reactor 12 is preferably provided with two cross pipes 26, 28 to receive sulfuric acid (at a rate of about 17.2 to 25.8 gpm) and phosphoric acid (at a rate of from about 5.2 to 7.8 gpm). A third pipe 30 incorporates the ammonia into the center of the reactor. The length of this pipe 30 is desirably at least twenty to thirty inches to ensure adequate mixing. A third cross pipe 32 incorporates the slurry and additional water into the mixing chamber. Positioned between the third cross pipe 32 and the first and second cross pipes 26 and 28 is an orifice plate 33 which is utilized to introduce turbulence into the flow of the slurry ensuring even greater mixing.

A typical pipe-cross reactor for use with the invention has a diameter of about three to ten inches, is from about seven to about fifty feet long, and terminates in, for example, a two to eight inch discharge pipe (or a slot of equivalent cross-sectional area), preferably with a stainless steel insert or TEFLON™ lining. The discharge pipe preferably discharges into a standard rotating drum granulator 14, and is preferably made of a steel pipe (e.g. HASTELLOY C-276 or 316L stainless steel (with HASTELLOY C or B for the reaction tube)). A TEFLON™, ceramic, or other corrosion-resistant lining may also be used in the pipe-cross reactor. The temperature is preferably maintained below 204.degree. C. (400.degree. F.).

Figure 5:
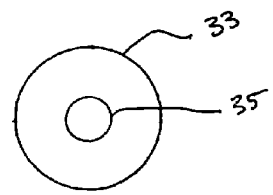
FIG. 5 A side view of an orifice plate utilized with a pipe-cross reactor.

The orifice plate 33, as shown in FIG. 5, includes a plate formed from a material similar to the pipe-cross reactor 12 and includes an orifice 35 or aperture which exhibits a smaller diameter than that of the pipe-cross reactor 12. Thus, for example, a pipe-cross reactor having a (6) inch diameter would employ an orifice plate 33 having an orifice 35 which exhibited a diameter less than inches, for example inches. In determining the size of the orifice 35, various parameters may be considered including flow rates of the slurry, acids and base, as well as the solid content of the slurry. Thus, the size of the orifice 35 may be changed for a given pipe-cross reactor 12 if the any process parameters are altered.

Although FIG. 5 shows use of a circular orifice plate, it was surprisingly discovered that adding a protuberance generally to increase turbulence upstream of the two pipe cross reactor provides greater heat recovery. In other embodiments, the turbulence is created through use of a protuberance, such as a bump, multiple bumps in series or parallel with respect to the flow stream, one or more wires, input of pressurized gas such as air, use of a sonic vibrator or vibrating wall at this position. For example, two, three, four, five, six, seven, eight or more equally spaced bumps that each protrude into the space towards the lumen middle, by, for example, 0.02, 0.05, 0.1, 0.2, or 0.3 times the diameter at that point may be used to create turbulence. In an embodiment a bump is an annular thickening that forms a constriction within the pipe. A sonic vibrator (for example such as that offered by Advanced Sonics, also may be used. A restriction, as shown in FIGS. 2 and 5, does not have to be round but can be another cross sectional shape, such as oval, square or irregular. An oval share is desirable, particularly with the narrow ends pointed to the cross pipes such that the larger oval axis extends across a line connecting the two cross pipe openings. In another embodiment the short axis of the oval extends across a line connecting the two cross pipes. The oval shape with long matching axis provides a turbulence that more closely matches the incoming flows from the perpendicular cross reactors and is particularly desired when perpendicular cross pipe reactors as shown in FIG. 2 are used.

The optimum placement of the protuberance(s) in many embodiments is between 0.1 to 3 flow stream diameters upstream of the average position of the cross reactor outlets (i.e. mean of the cross reactor outlets, which may be staggered down the length of the flow stream). More preferably the protuberances are located between 0.3 to 1.5 diameters ahead of the cross pipe reactors. Optimum placement will vary depending on the flow rate. For a very high flow rate the protuberance(s) should be set further away or the degree of protuberance into the flow path should be limited. This embodiment may be carried out by an adjustable annular ring or adjustable bumps that provide the ability to control the distance away and the degree of flow path entry of the protuberance. An annular ring may be adjusted for opening size and may be mounted at alternative locations, for example. Multiple sonic vibrators, if used may be placed at different locations and individually switched to accommodate slower (vibrate closer to the cross pipes) or faster (further away location) flow rate and/or lowered viscosity.

Adjustment of the cross pipe reactor itself may be optimized for a given viscosity and flow rate. In many embodiments the cross reactor pipes advantageously are exactly opposite each other, as shown in FIG. 2. This placement is desirable when adding comparable viscosity fluids at comparable flow rates. Also desirable, is the use of multiple (3 or 4, or more) cross pipes. For example, a four way (four perpendicular pipes) that administers two materials each through two opposing sides, may be used if the viscosity is low enough. Multiple cross reactor pipes may be switched to accommodate changes in viscosity and/or flow rate. For example a less viscous material or higher flow rate system may benefit by using one or more cross reactor inlets that are further away (more downstream) with respect to the protuberance(s) and that can be opened and closed. Other combinations may be optimized upon routine calibration, by changing the flow, and/or type of sludge material and/or a reagent and then monitoring for heat recovery by measuring temperature downstream at one or more points. By providing adjustable protuberance(s), and/or cross pipe placements, and/or flow rates optimized heat recovery may be obtained.

Yet another embodiment provides an automatic system that constantly monitors temperature of mixed material at some point downstream of the cross pipe reactor and adjusts protuberance positioning, flow rate of sludge, flow rate of base, flow rate of added water, flow rate of one or more acids, and switching of cross reactor outlets for optimum effect. In a desirable embodiment flow rate of base, and/or dilution water and/or an acid and/or a second acid and/or sludge is adjusted up or down to obtain a higher temperature. In another embodiment a switch selects between two or more cross pipes to obtain a more desirable temperature. In yet another embodiment some of the released heat is transferred in a controllable way back to an input stream to obtain a more desirable viscosity for adequate mixing. A control system may adjust heat transfer up or down depending on the heat recovered, or depending on another monitored variable, such as back pressure to the sludge pump(s) or back pressure measured at a pipe-cross reactor gauge.

Without wishing to be bound by any one theory of this embodiment of the invention, it is thought that the use of a protuberance such as an orifice plate allows greater mixing of the slurry by inducing a zone of turbulence downstream of the orifice plate 33 and generally in the vicinity of the first and second cross pipes 26 and 28. The increased turbulence generated in many cases increases heat production as measured as a higher melt temperature. The temperature also can be measured at or downstream of the last cross pipe addition of reagent, such as for example, 1 or 2 pipe diameters further downstream of the last cross pipe. It has been observed that use of an orifice plate has effected an increase of heat recovery, as much as approximately 30%, over similar pipe-cross reactors lacking an orifice plate. An orifice plate 33 may be changed for another orifice plate exhibiting a different diameter orifice 35 if desired.

Referring to FIG. 2, ammonia is introduced into the representative system depicted here at a rate of from about 4.3 gpm. Organic waste material (e.g. sewage sludge) and water are incorporated at a rate of from about 30 to about 40 gpm of slurry. The pipe-cross reactor shown here typically operates at a gage pressure of between fifteen and sixty psig.

A hot melt discharges from the pipe-cross reactor 12 into the granulator 14, while water flashes from the reactor product as it issues into the granulator 14. Steam is generated by the exothermic reaction conducted within the pipe-cross reactor 12.

Figure 3:
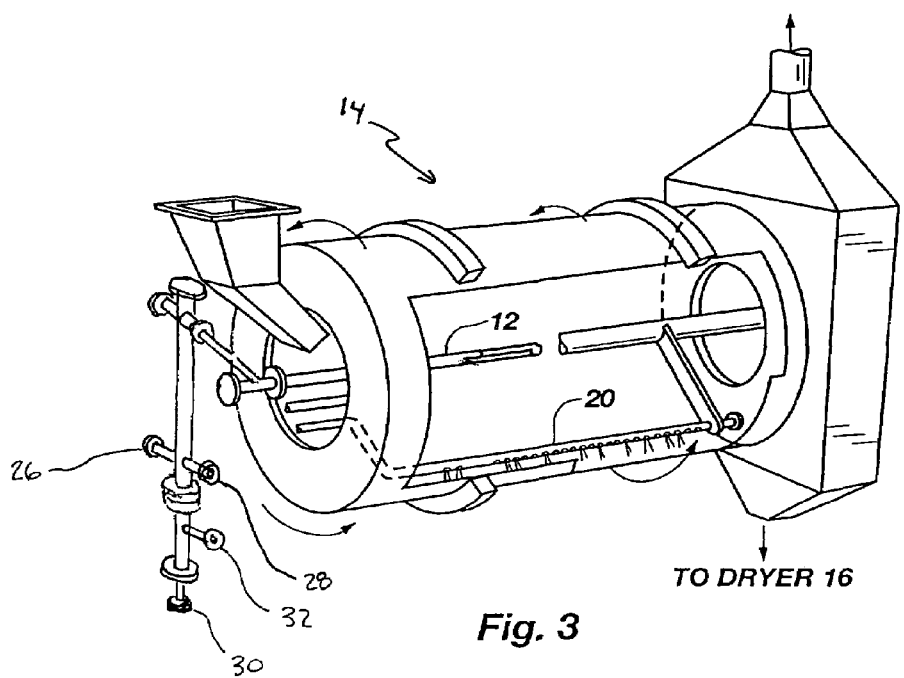
FIG. 3 A partially cut away, perspective view of a pipe-cross reactor in a rotary ammoniator-granulator.
Figure 4:
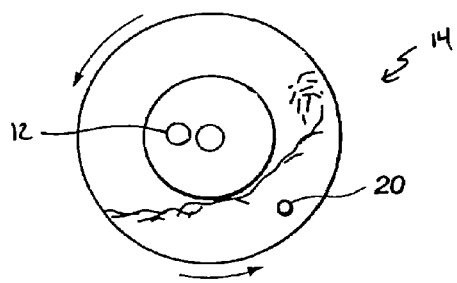
FIG. 4 A stylized end view of a rotating bed of material in a granulator.

A preferred granulator (e.g. an ammoniator-granulator), depicted in FIGS. 3 and 4, is a two to four meter diameter rotating drum granulator having a length of from about five to about nine meters. As shown in FIG. 3, the pipe-cross reactor 12 is oriented vertically and includes a number of 90 transitions or bends prior to entering the granulator 14. The shown position of the pipe-cross reactor 12 is preferred as it provides greater mixing capabilities. However, satisfactory results may be achieved with the pipe-cross reactor 12 oriented horizontally without any transitions or bends (e.g. U.S. Pat. Nos. 5,984,992 and 6,159,263).

In the depicted process, the granulator 14 includes an ammonia sparger 20 operably positioned within the granulator 14 for the addition of ammonia to the melt to complete the reaction of acid and base for the final product. The melt is rolled onto recycled fine particles within the granulator 14 to form granulated particles, thus causing the granulated particles to grow to a desired size. Afterwards, as depicted in FIG. 1, these granulated particles are passed into a rotary dryer 16 for a sufficient amount of time to reduce their moisture content, thus forming a fertilizer having an enhanced plant nutrient value. The vapors formed during the reaction of the slurry with the acid and base (e.g. the flashed off steam) are also collected and conveyed into the rotary dryer 16 for increasing the dew point vapors so as not to condense in the plant equipment.

Passing such vapors directly into the dryer 16 is an alternative process as compared to that of U.S. Pat. Nos. 5,984,992 and 6,159,263. Previous processes associated with pipe-cross reactors have typically separated the granulated particles from the vapor for independent processing prior to the drying of the granulated particles. The presently depicted process eliminates the need for additional particulate separation equipment and processing of the air and ultimately results in a simpler and more efficient process.

A preferred dryer for use with the invention is a two to four meter diameter rotating drum dryer having a length of from about seventeen to about thirty three meters, and having a heating capacity of 30 to 70 million BTU/hour, with a lump crusher at the discharge end.

The process further includes passing the dried granulated particles to a granule separation apparatus, such as a screen 18, and separating the dried granulated material into fines, product and oversized material. Oversized material is reduced in size to be incorporated, as a fine, back into the process. The fines are returned to the granulator 14 (along with potash or any micronutrients required for the desired final product analysis) for incorporation into the process.

During the process, fumes, which may contain ammonia, particulates, and water vapor above its dew point, are collected from the dryer 16 and passed through particulate separating equipment, such as a dust cyclone 34. The dust cyclone 34 removes a portion of the particulates from the air and recycles these particulates (e.g. dust) with the fines and ground material. The resultant fumes leave the dust cyclone 34 and are processed through additional particulate separating equipment, such as a baghouse filter 36. The baghouse filter serves to remove an additional amount of particulates, particularly particulates which exhibit a smaller size than those removed by the dust cyclone 34. Particulates removed from the baghouse filter 36 are similarly recycled with the fines and ground material for use in the granulator 14.

The fumes leaving the baghouse filter 36 are subsequently processed through a scrubber 38, such as a venturi scrubber or packed bed scrubber, which includes water separation chambers for collecting ammonia fumes and small dust particles. The invention uses low pH water in the scrubber 38 to collect unreacted ammonia vapors escaping the granulator 14. In one embodiment, small amounts of sulfuric or phosphoric acid are added to the scrubber 38 to maintain a low pH (e.g. 2 to 3) for proper ammonia vapor scrubbing.

The process further includes oxidizing the air exiting the scrubber, such as in a regenerative thermal oxidizer (RTO) 40. The RTO 40 is used to destroy volatile organic compounds (VOCs) and other gaseous hydrocarbon pollutants that would otherwise be released into the atmosphere. The RTO 40 destroys such VOCs and hydrocarbon fumes through a process of high temperature thermal oxidation, converting the VOCs and fumes to carbon dioxide and water vapor. The oxidation of the air further serves to substantially eliminate any noxious odors that would otherwise be exhausted into the atmosphere. Energy released from the oxidation process is recycled to reduce operating costs.

Air is drawn from the RTO 40 and exhausted into the atmosphere through a stack 42. The process may advantageously include using heat from the exhaust in the stack 42 to preheat the base (e.g. ammonia) prior to its introduction into the pipe-cross reactor 12 and/or the granulator 14 via the sparger 20.

Another aspect of the ventilation for the depicted process includes collecting air from the screens 18. The process contemplates two options, both of which involve particulate removal and recycling of both particulates and air. The first option includes processing the air through a dust cyclone 34 and recycling both the particulates and the air back to the granulator 14. The second option includes utilizing the dust cyclone 34, but further includes processing the air through a baghouse filter 36, again collecting the particulates for recycling in the granulator. The air leaving the baghouse filter 36 is advanced to the dryer 16 instead of the granulator 14.

Other aspects of a ventilation system for use with the invention preferably include fans for moving the air to and from the various processing stages described above herein. Volume of air moved is determined by the amount of moisture to be removed (above dew point) and the melting point or disassociation temperature of the fertilizer product.

NPK fertilizers preferably include the micronutrients iron and zinc. In a preferred embodiment, spent acid from a hot dip galvanizing or steel pickling process is used to maintain the low pH of the scrubber water. These spent acids commonly are sulfuric acid of five to ten percent strength, containing three to eight percent iron. Galvanizing spent acid contains three to eight percent zinc along with iron. The iron and zinc are fed with the ammonia-laden scrubber water from scrubbing to the sludge slurry tank and on to the pipe-cross reactor for incorporation as iron and zinc micronutrients in the final NPK fertilizer. In the case of spent sulfuric acid, the sulfur also becomes a nutrient in the resulting fertilizer, since it reacts in the pipe-cross reactor to form ammonium sulfate.

Other micronutrients or additional ingredients may be incorporated into the resulting fertilizer by adding them with a weigh feeder as a dry solid to the fines recycle stream. Micronutrients or additional ingredients include lime, dolomite, calcite, hydrobiotite, gypsum, phosphates (e.g. rock phosphate or ammonium phosphate), potash, urea, soil clays, calcium peroxide, ammonium nitrate, vermiculite, humic acid, and trace minerals such as iron, manganese, magnesium, boron, copper, and zinc.

Although the invention has been most particularly described for the processing of municipal sewage sludge, the inventive process may also be used to enhance the plant nutrient value of other relatively low analysis organic waste material such as poultry manure, food processing wastes, wastes from paper manufacturing, swine manure sludge, mixtures thereof, and the like. In such a case, the particular relatively low analysis organic waste material is substituted for the sewage sludge in the process, and the process parameters are accordingly modified.

The following examples are offered to illustrate embodiments of the present invention, but should not be viewed as limiting the scope of the invention.

EXAMPLES

Example 1

In an agitation tank, 6700 kilograms/hour (7.4 tons/hour) of sewage sludge were mixed with 37 liters per minute (ten gallons/minute (gpm)) of scrubber water to form a slurry. The slurry was of such a consistency (a solids content varying between 10% and 27%) that it can be pumped with a positive displacement pump or other suitable pump to a pipe-cross reactor equipped to receive ammonia, sulfuric acid, phosphoric acid, sewage sludge, and water. The pipe-cross reactor had a diameter of approximately four inches and was forty feet long. The pipe-cross reactor terminated in a rotating drum granulator. The rotating drum granulator was six feet in diameter and twenty feet long.

The slurry was added to the pipe-cross reactor and reacted with 8.6 gpm 99.5% ammonia, 8.6 gpm sulfuric acid (93%), and 2.6 gpm phosphoric acid (54% $P_2O_5$). The temperature of the pipe-cross reactor (due to the exothermic reaction between the acid and the base) was maintained at about 149.degree. C. (300.degree. F.) with moisture in the sludge. This temperature (above minimum sterilization temperature) acts to kill *Salmonella, E. coli*, and other pathogens which may be found in the slurry. This temperature also acts to deodorize the material somewhat.

The resulting melt from the pipe-cross reactor is sprayed onto a recycling bed of fines, along with 2000 pounds of added potassium chloride (60% $K_2O$) while the water contained in the melt flashed off as steam. An ammonia sparger is provided in the granulator to add small amounts of ammonia to the granulation mixture for reaction completion and final hardening of granules.

Operating the pipe-cross reactor in such a manner incorporated approximately 14.8 tons per hour of 20% solid sewage sludge at a ten ton per hour production rate.

Granulated material exits the granulator at about 93.degree. C. (200.degree. F.) and at about a five to fifteen percent moisture content into a rotary dryer. The rotary dryer was approximately two meters in diameter and has a length of about twenty meters. It has a heating capacity of 30 million BTU/hour and is associated with a lump crusher or lump breaker at the discharge end. The moisture in the material was reduced to less than three percent by heated forced air in the dryer.

Materials exiting the rotary dryer were run through the lump crusher to reduce oversized material to less than one inch in size.

Screens are used to separate the material into (a) fines, (b) product and (c) oversized material. Fines are returned to the granulator. Product went to a two meter diameter, twenty meter long cooler and then on to storage, while the oversized material is passed through a grinding mill and reduced to fines for recycling to the granulator. About two tons (1800 kg) of fine material per ton of product were required in the recycle stream.

Fumes from the granulator containing steam, ammonia and particulate were collected by maintaining a negative pressure inside the granulator with a fan pulling the fumes into the rotary dryer to reduce the moisture content thereof. The air was drawn from the granulator at a rate of 20,000 cubic feet per minute (cfm) at a temperature of 92.degree. C. (198.degree. F.) and at 100% relative humidity. This is roughly equivalent to conveying 34,200 pounds per hour (lbs/hr) of water and 296 pounds per minute (lbs/min) of dry air.

The air from the rotary dryer was directed to a dust cyclone, a baghouse filter, and then a scrubber. Air was drawn from the dryer at a rate of 70,000 cfm at 45% relative humidity. The air leaving the dryer had a dry bulb temperature of approximately 93.degree. C. (200.degree. F.) and a wet bulb temperature of 74.degree. C. (165.degree. F.). This is roughly equivalent of conveying 56,100 lbs/hr water and 2,711 lbs/min of dry air. Air entering the scrubber is scrubbed with low pH water (water at a pH lowered by the addition of spent acid from a hot dip galvanizing process). If galvanizing acid is unavailable, the pH may be controlled with phosphoric or sulfuric acid. The low pH water collects ammonia vapor present in the fumes, as well as dust particles.

Air was directed from the scrubber to a regenerative thermal oxidizer at a rate of 67,100 cfm at a temperature of 165.degree. F. and at 100% relative humidity. Oxidized air was then drawn from the regenerative thermal oxidizer and is exhausted through a stack approximately one hundred (100) feet tall at a temperature of 93.degree. C. (200.degree. F.).

Dust-laden air is collected from the grinding mills and screens by a fan maintaining negative pressure on the equipment. The air is pulled through a cyclone system that removes about 97% of the dust. From the cyclones, the air was passed back to the rotary granulator and the dust added to the recycled fines.

The resulting fertilizer had an NPK value of 12-3-6 (12% nitrogen, 3% phosphate, and 6% potash). It was also homogenous and properly sized for standard application equipment.

Example 2

The process of Example I is repeated in a tubular reactor rather than a pipe cross reactor. In an agitation tank, 6700 kilograms/hour (7.4 tons/hour) of sewage sludge are mixed with 37 liters per minute (ten gallons/minute (gpm)) of scrubber water to form a slurry. The slurry is of such a consistency that it can be pumped with a positive displacement pump or other suitable pump to a tubular reactor equipped to receive ammonia, sulfuric acid, phosphoric acid, sewage sludge, and water. The tubular reactor preferably has a diameter of approximately 1.5 to 30 cm and a length of 2 to 10 meters, preferably 5 to 8 meters. The reactor terminates in a rotating drum granulator. The rotating drum granulator is six feet in diameter and twenty feet long.

The slurry is added to the reactor and reacted with 8.6 gpm 99.5% ammonia, and an acid solution containing 8.6 gpm sulfuric acid (93%) and 2.6 gpm phosphoric acid (54% $P_2O_5$). The temperature of the reactor (due to the exothermic reaction between the acid solution and the base) is maintained at about 149.degree. C. (300.degree. F.) with moisture in the sludge.

The resulting melt from the reactor is sprayed onto a recycling bed of fines, along with 2000 pounds of added potassium chloride (60% $K_2O$) while the water contained in the melt flashes off as steam. An ammonia sparger is provided in the granulator to add small amounts of ammonia to the granulation mixture for reaction completion and final hardening of the granules.

Granulated material exits the granulator at about with a moisture content into a rotary dryer. The rotary dryer is approximately two meters in diameter and has a length of about twenty meters. It has a heating capacity of 30 million BTU/hour and is associated with a lump crusher or lump breaker at the discharge end. The moisture in the material is reduced to less than three percent by heated forced air in the dryer.

Materials exiting the rotary dryer are run through the lump crusher to reduce oversized material to less than one inch in size.

Screens are used to separate the material into (a) fines, (b) product and (c) oversized material. Fines are returned to the granulator. Product goes to a two meter diameter, twenty meter long cooler and then on to storage, while the oversized material is passed through a grinding mill and reduced to fines for recycling to the granulator. About two tons (1800 kg) of fine material per ton of product are required in the recycle stream.

Fumes from the granulator containing steam, ammonia and particulate are collected by maintaining a negative pressure inside the granulator with a fan pulling the fumes into the rotary dryer to reduce the moisture content thereof. Air is drawn from the granulator at a rate of 20,000 cubic feet per minute (cfm) at a temperature of 92.degree. C. (198.degree. F.) and at 100% relative humidity. This is roughly equivalent of conveying 34,200 pounds per hour (lbs/hr) of water and 296 pounds per minute (lbs/min) of dry air.

The air from the rotary dryer is conveyed to a dust cyclone, a baghouse filter, and then a scrubber. Air is drawn from the dryer at a rate of 70,000 cfm at 45% relative humidity. The air leaving the dryer has a dry bulb temperature of 93.degree. C. (200.degree. F.) and a wet bulb temperature of 74.degree. C. (165.degree. F.). This is roughly equivalent of conveying 56,100 lbs/hr water and 2,711 lbs/min of dry air. Air entering the scrubber is scrubbed with low pH water. The low pH water collects ammonia vapor present in the fumes, as well as dust particles.

Air is conveyed from the scrubber to a regenerative thermal oxidizer at a rate of 67,100 cfm at a temperature of (165.degree. F.) and at 100% relative humidity. Oxidized air is then drawn from the regenerative thermal oxidizer and is exhausted through a stack approximately one hundred feet tall at a temperature of 93.degree. C. (200.degree. F).

Dust-laden air is collected from the grinding mills and screens by a fan maintaining negative pressure on the equipment. The air is pulled through a cyclone system that removes about 97% of the dust. From the cyclones, the air is passed back to the rotary granulator and the dust is added to the recycled fines. The resulting fertilizer is determined to have an NPK value.

Other embodiments and uses of the invention will be apparent to those skilled in the art from consideration of the specification and practice of the invention disclosed herein. All references cited herein, including all U.S. and foreign patents and patent applications, including U.S. patent application Ser. Nos. 08/852,663, 09/735,768 and 09/416,370, are specifically and entirely incorporated herein by reference. It is intended that the specification and examples be considered exemplary only, with the true scope and spirit of the invention indicated by the following claims.

The invention claimed is:

1. A method of treating an organic waste material to form a nutritional composition for plants comprising:
   mixing said organic waste material with scrubber water to form a slurry capable of being pumped;
   pumping said slurry to a reactor selected from the group consisting of a pipe-cross reactor and a tubular reactor for reaction with a base and acid to form a melt;
   spraying said melt onto a recycling bed of fines in a granulator, and flashing off water contained in said melt as steam;
   rolling said melt onto fine particles in said granulator to form granulated particles;
   further reacting the melt with ammonia in the granulator to complete product formation reaction;
   drawing fumes from said granulator;
   drying said fumes prior to oxidizing;

oxidizing said fumes to reduce any noxious odor associated therewith; and drying said granulated particles in said dryer to reduce the moisture content thereof to form dried granulated particles comprising an enhanced plant nutrient value composition.

2. The method of claim 1 further comprising passing said fumes through a dust cyclone subsequent to drying said fumes and prior to oxidizing.

3. The method of claim 2 further comprising passing said fumes through a baghouse filter subsequent to passing said fumes through a cyclone, and prior to oxidizing.

4. The method of claim 3 further comprising passing said fumes through a scrubber subsequent to passing said fumes through a baghouse filter, and prior to oxidizing.

5. The method of claim 4 wherein passing said fumes through a scrubber includes scrubbing said fumes with water and acid.

6. A method of treating an organic waste material to form a nutritional composition for plants comprising:

mixing said organic waste material with scrubber water to form a slurry capable of being pumped;

pumping said slurry to a reactor selected from the group consisting of a pipe-cross reactor and a tubular reactor for reaction with a base and acid to form a melt;

spraying said melt onto a recycling bed of fines in a granulator, and flashing off water contained in said melt as steam;

rolling said melt onto fine particles in said granulator to form granulated particles;

further reacting the melt with ammonia in the granulator to complete product formation reaction;

drawing fumes from said granulator;

oxidizing said fumes to reduce any noxious odor associated therewith; and drying said granulated particles in said dryer to reduce the moisture content thereof to form dried granulated particles comprising an enhanced plant nutrient value composition;

wherein oxidizing said fumes includes passing said fumes through a regenerative thermal oxidizer.

7. A method of treating an organic waste material to form a nutritional composition for plants comprising:

mixing said organic waste material with scrubber water to form a slurry capable of being pumped;

pumping said slurry to a reactor selected from the group consisting of a pipe-cross reactor and a tubular reactor for reaction with a base and acid to form a melt;

spraying said melt onto a recycling bed of fines in a granulator, and flashing off water contained in said melt as steam;

rolling said melt onto fine particles in said granulator to form granulated particles;

further reacting the melt with ammonia in the granulator to complete product formation reaction;

drawing fumes from said granulator;

oxidizing said fumes to reduce any noxious odor associated therewith;

drying said granulated particles in said dryer to reduce the moisture content thereof to form dried granulated particles comprising an enhanced plant nutrient value composition; and exhausting said fumes through a stack, and transferring heat from said fumes to said base substantially simultaneously with said exhausting.

8. A method of treating low analysis organic waste material to form a nutritional composition for plants comprising:

providing a slurry of low analysis organic waste material capable of being pumped;

pumping said slurry to a pipe-cross reactor and reacting at least one substance selected from the group consisting of a base and an acid to form a melt;

directly spraying the melt onto a recycling bed of fines in a granulator and flashing off water contained in said melt as steam;

rolling said melt onto fine particles in said granulator to form granulated particles;

conveying said granulated particles to a dryer;

drying said granulated particles in said dryer to reduce the moisture content thereof thereby forming dried granulated particles of nutritional value to plants; and conveying gaseous vapor formed during said reaction and said forming of granulated particles to said dryer with said granulated particles, said gaseous vapor including said flashed-off steam.

9. The method of claim 8 further comprising exhausting fumes containing water vapor, ammonia and particulates from said dryer and oxidizing said fumes to reduce any noxious odor associated therewith.

10. The method of claim 9 further comprising removing a portion of said particulates from said fumes prior to oxidizing said fumes.

* * * * *